United States Patent
Kjellberg

(10) Patent No.: US 8,019,274 B2
(45) Date of Patent: *Sep. 13, 2011

(54) BROADCAST SYSTEM AND METHOD FOR CELLULAR NETWORKS

(75) Inventor: Rikard Kjellberg, Santa Cruz, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/691,343

(22) Filed: Jan. 21, 2010

(65) Prior Publication Data

US 2010/0120354 A1    May 13, 2010

Related U.S. Application Data

(63) Continuation of application No. 11/078,595, filed on Mar. 11, 2005, now Pat. No. 7,706,739.

(51) Int. Cl.
*H04H 1/00* (2006.01)

(52) U.S. Cl. ........ 455/3.01; 455/454; 455/434; 455/515

(58) Field of Classification Search ............... 455/3.01, 455/454, 434, 515, 3.02, 3.03, 3.04, 414.1, 455/452.1, 414.2, 435.1, 67.11; 370/329, 370/432

See application file for complete search history.

(56) References Cited

U.S. PATENT DOCUMENTS

| | | |
|---|---|---|
| 6,834,156 B1 * | 12/2004 | Marko et al. .................... 386/94 |
| 2001/0017849 A1 | 8/2001 | Campanella et al. |
| 2004/0006541 A1 | 1/2004 | Huddelston et al. |
| 2004/0068551 A1 | 4/2004 | Hymel et al. |
| 2005/0148296 A1 * | 7/2005 | Kopra et al. ................. 455/3.01 |
| 2005/0250520 A1 | 11/2005 | Johnson et al. |
| 2006/0056341 A1 * | 3/2006 | Takagi et al. ................. 370/328 |

* cited by examiner

*Primary Examiner* — John Lee

(57) ABSTRACT

An example system comprises one or more base stations, each base station associated with a cell, a Channel-to-Subscriber Management Entity operable to register a channel and a plurality of subscribers to that channel, wherein each subscriber is located in at least one of the cells, and a router operable to send media content associated with the channel to the one or more base stations, wherein each base station is operable to transmit the content to the subscribers in its cell at the same time.

20 Claims, 2 Drawing Sheets

BROADCAST SYSTEM AND METHOD FOR CELLULAR NETWORKS

RELATED PATENT DOCUMENTS

This patent document is a continuation under 35 U.S.C. §120 of U.S. patent application Ser. No. 11/078,595 filed on Mar. 11, 2005 now U.S. Pat. No. 7,706,739, to which priority is claimed here.

BACKGROUND OF THE INVENTION

Traditional broadcast stations transmit data to millions of users at the same time. For instance, a television (TV) station may have one or more broadcast antennas that transmit a signal over a large geographic area. Viewers in that area tune their receivers to the operating frequency of the station to receive the data. In terms of the number of transmissions needed to reach viewers, this system is efficient in that one broadcast transmission can reach millions of users at a time.

The opposite of a broadcast transmission is a point-to-point transmission. Examples of point-to-point transmissions are telephone calls wherein person A calls person B. The cellular telephone system represents one category of point-to-point communication systems. As cellular telephone service providers have increased their sophistication and services offered, more and more consumers have come to rely on cellular telephone systems for services beyond basic voice calls. Examples include browsing the Internet, retrieving email and downloading content that helps personalize the cellular telephone.

In recent years, traditional cellular service providers have tried various ways to send the same content to a group of wireless users. For instance, some providers offer news services, wherein a wireless user may sign up for news content to be delivered as Short Message Service (SMS) messages to his or her phone. Currently, if one thousand wireless users are all entitled to receive the same news content, the wireless provider sends individual messages to each user with the content therein. Thus, to reach one thousand users, one thousand message transmissions are needed. This is much different than the broadcast TV example above, because of the point-point nature of the cellular system.

Sending such a large number of messages, containing identical content, in a short time is an inefficient use of network capacity. It may congest the network, preventing other messages from being delivered in a timely manner. It may also require the wireless service provider to invest in more equipment in order to cope with usage spikes that occur at particular times of the day.

BRIEF SUMMARY OF THE INVENTION

The present invention is directed to a system and method for providing a broadcast system for cellular networks. In an example embodiment, a system includes a Channel-to-Subscriber Management Entity (CSME) and one or more base stations providing service to users in respective cells.

The CSME allows registration of a number of broadcast channels, each channel with its own unique channel identifier. The registration process can be achieved via a man-machine interface, or via interface to an external application. The CSME also manages a set of subscriptions to those channels by consumers. Each consumer has access to a device that allows interaction with the CSME. The interaction can be achieved via a common Internet browser interface, for example. Using the device, the consumer requests a subscription to a channel. The CSME registers the subscription and sends a key to the device, which allows the device to decode and consume content that is broadcast on the subscribed channel.

The structure of cellular service is such that a base station services devices in a geographic area, known as a cell, by broadcasting data over that area. The network uses one of a number of multiple access techniques to ensure that messages are sent only to their intended recipients and that multiple messages can be sent during a time period with no perceivable interruption to a human user.

The subscription channel is identified by a unique channel identifier. The unique channel identifier and the key, that the device has received, are used to decode data that is broadcasted in the cell. Data that is successfully decoded into content will be forwarded to the appropriate device application so that the subscriber can consume the content. When the CSME sends the content to its subscribers, it sends the content as a message to a specific channel, encoding the message with the unique channel identifier. Because the messages are broadcast in each cell, subscribers in each cell recognize the messages as channel content by the unique channel identifier and present the content to their respective users.

Accordingly, each device looks at all messages sent in its cell to determine if one or more of those messages are sent on a subscribed channel. Messages that are subscribed content are consumed (presented to the user or cached for later viewing). Messages that are not subscribed content are simply disregarded. In this way, the sending of channel content is a broadcast (one-to-many) rather than a point-to-point communication. Content that is sent to one thousand subscribers can be sent in a handful of messages, rather than as one thousand individual messages. This functionality provides for a more efficient use of the communicating capacity of the wireless network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
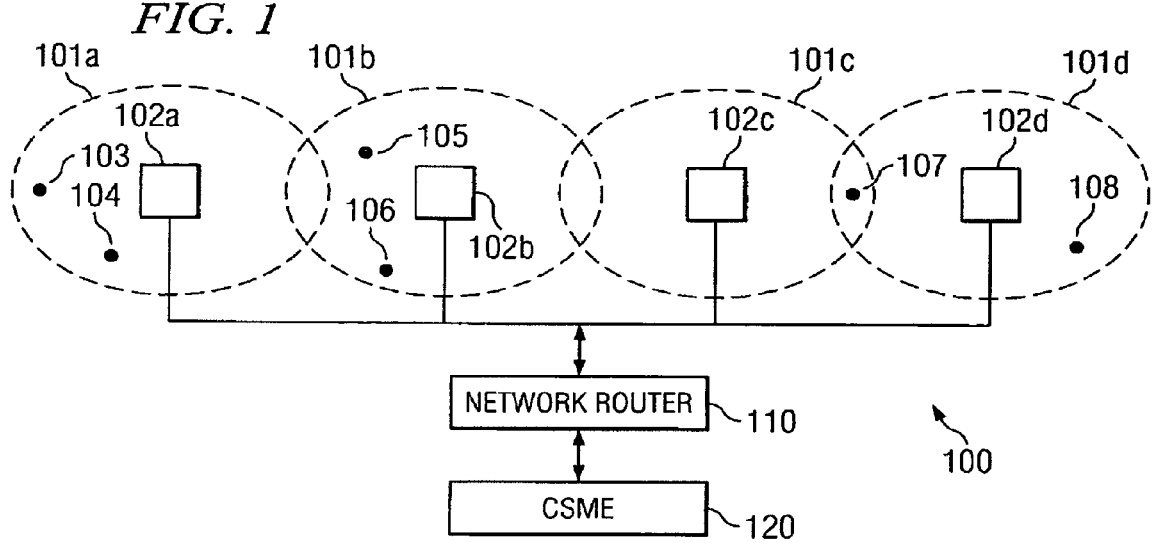
FIG. 1 is an illustration of an exemplary system for providing a broadcast system for cellular networks.

FIG. 1 is an illustration of exemplary system 100 for providing a broadcast system for wireless cellular networks. System 100 includes cells 101a-101d, which are geographic areas serviced by respective network base stations 102a-102d. Devices 103-108 are each located in at least one cell so that, for example, devices 103 and 104 are in cell 101a and are serviced by base station 102a. Devices 103-108 may be any of a number of devices that are compatible with various cellular networks. Examples of devices are cell phones, pagers, Personal Digital Assistants (PDAs), laptop computers, and the like. While some devices, such as pagers, may be receive-only, it should be noted that any one or all of devices 103-108 may be able to transmit as well as receive. Each device may, for example, be associated with one or more human users. While reference is made to sending content to users, it is understood that the content is sent to a device that then presents the content to a user in a perceivable, usable format, such as audio/visual format.

Cellular network 100 services both devices 103 and 104 in common cell 101a through use of a multiple access technique. Many techniques exist in the art for multiple access, including Time Division Multiple Access (TDMA), Code Division Multiple Access (CDMA), Global System for Mobile communications (GSM), and the like. The present invention is not limited to any one multiple access technique, but rather, may be adaptable to a wide variety of multiple access techniques now known or later developed.

System 100 further includes router 110 and Channel-to-Subscriber Management Entity (CSME) 120. CSME 120 is operable to register content channels and a plurality of subscribers to those content channels. The registering of subscribers and channels is explained in detail below. Router 110 is operable to send media content associated with those channels to base stations 102a-102d. Wireless devices 103-108 are subscribers to one or more of the channels. Base stations 102a-102d are each operable to transmit the content to the subscribers at the same time, as described more fully below.

Figure 2:
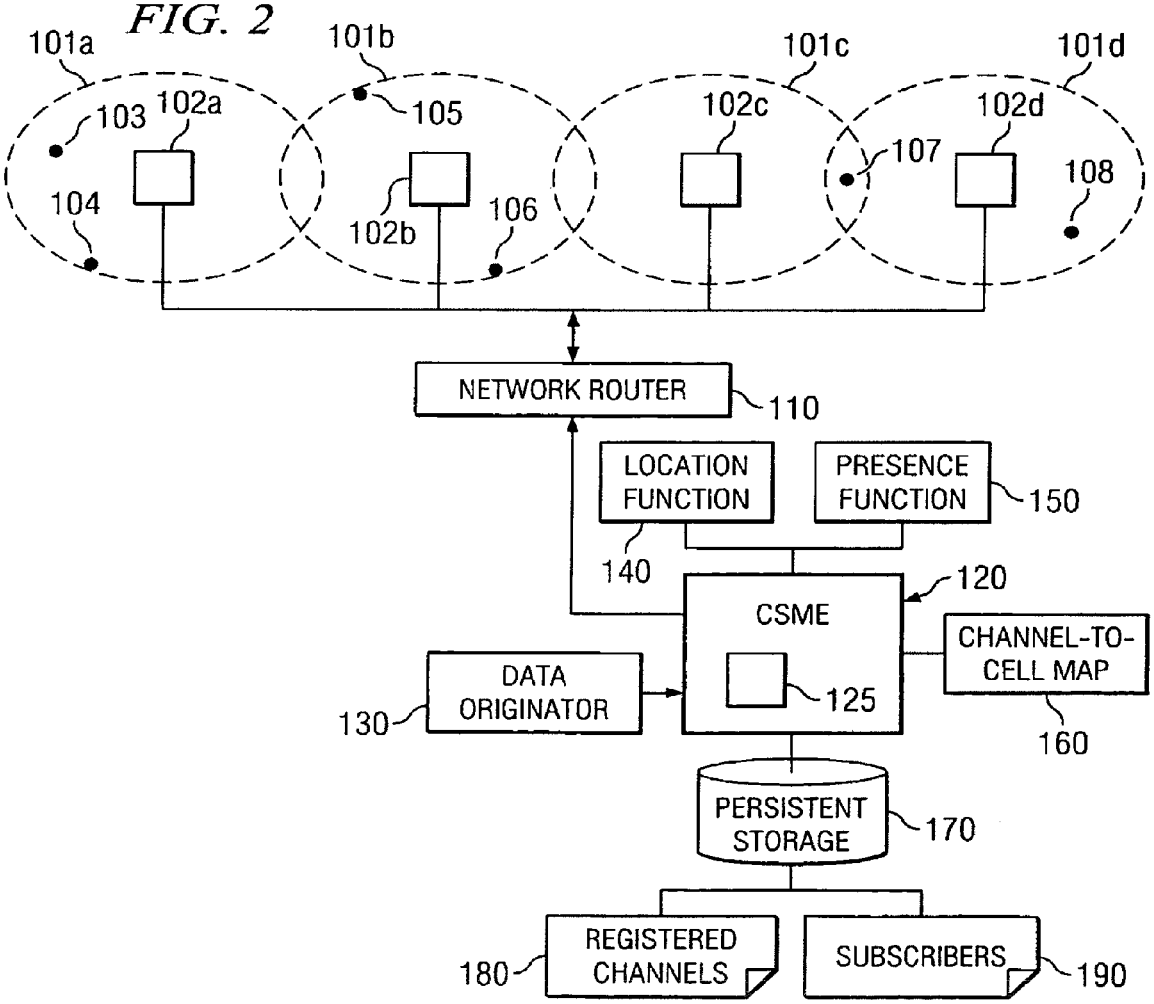
FIG. 2 is an illustration of an exemplary system for providing a broadcast system for cellular networks.

FIG. 2 is an illustration of exemplary system 200 for providing a broadcast system for wireless cellular networks. System 200 includes the components shown in system 100 (of FIG. 1), and includes other components to provide a more comprehensive illustration of a system adapted according to various embodiments.

CSME 120, in this example, is a software application implemented on a general purpose or special purpose computer device. In a preferred embodiment, it is run on a multi-processor computer adapted for receiving and sending large amounts of data while performing the calculations necessary for its functions. It may be similar to an enterprise server used by a large business for its high speed and high reliability.

Data originator 130 is a content provider that accesses CSME 120, for example, through an Internet connection. Data originator 130 is a media company or other entity who desires to register a channel and publish content to that channel. Data originator 130 provides, for example, a sports channel that includes scores and video clips, a news channel, or other special interest channel, by sending the content to the CSME. The content can include text, streaming media, audio/video files, or the like. The content type is not limited by the invention. Data originator 130 may register the channel through its connection to CSME 120 or through other means. In fact, an entity other than data originator 130 may register channels on behalf of data originator 130. The present invention is not limited by the method of channel registration. CSME 120 manages persistent storage 170 to store information 180 and 190 related to registered channels and subscribers. Information 180 relates to the registered channels and contains, for example, the content to be broadcast in each channel, unique channel identifiers, and the like. Information 190 relates to subscribers and contains a database that lists the subscribers in the wireless network, their device hardware identifications, and the channels to which they subscribe. The use of information 170 and 180 is exemplary, and the invention is not limited to such information items. In this example, persistent storage 170 is a hard drive or other larger, non-volatile memory suited for storing information 180 and 190.

The channels managed by CSME 120 are identified by alphanumerical unique channel identifiers. A unique channel identifier is used to encode the content that is to be transmitted on a specific, respective channel. As will be discussed in more detail below, a device that is configured to subscribe to a channel checks the packets it receives from the base station for the unique channel identifier. When it receives a packet with the identifier of its subscribed channel, it consumes the data by converting it to perceivable information or caching it for later use. When a wireless device receives a packet with a unique identifier of a channel that it does not subscribe to, it simply disregards the packet. In this way, content may be consumed by subscribers while enforcing subscription policy against non-subscribers. CSME 120 manages channels by assigning unique channel identifiers, managing the occurrence of broadcasts, and managing user subscriptions to the channels.

In this example, the channels do not utilize a separate frequency band or a separate connection, but rather, they utilize the existing transmission capabilities of the cell. In this example embodiment, packet information for a sports channel will carry the unique channel identifier of the sports channel. Receiving devices look at the unique channel identifier and determine whether to consume the content based upon whether they are subscribers to the channel. In one aspect, the channel may be referred to as a "broadcasting protocol port" because the content is transmitted to a cell wherein multiple users in the cell may consume the content from a single message transmission, as explained more fully with regard to FIG. 4.

Accordingly, while traditional broadcast stations, such as TV or radio, may define a channel by its operating frequency, the present invention defines its channels through digital unique identifiers. Further, while a number of traditional broadcast stations may share the same geographic area through use of their different operating frequencies, the present invention allows a cell to serve a number of different channels through use of the unique channel identifiers and multiple access techniques.

A device, such as devices 103-108, may become a subscriber through a number of registration processes. For example, a user associated with device 103 accesses a website associated with the provider and requests access to a sports channel. The user access the website through a Graphical User Interface (GUI) provided in device 103, or alternatively, through another access means, such as a personal computer connected to the Internet. CSME 120 then updates its database in persistent storage 170 to show that device 130 is a subscriber to the uniquely identified sports channel. CSME 120 then uses the wireless network to send a key to device 103. In this example, the key is data or instructions saved on device 103 that allows device 103 to consume the content. In the same way, if the user decides to unsubscribe to the sports channel, CSME 120 updates its database and uses the network to send data or instructions to device 103 that prevent device 103 from presenting the content to the user. Payment of money may be a part of either or both channel registration and subscription, such that, for example, wireless network providers may charge for subscription services or registration of channels. Other ways of subscribing or unsubscribing are within the scope of embodiments of the present invention.

Once subscriptions and channels exist and are managed by CSME 120, it is possible to send content to the subscribers. CSME 120 scans through its list 180 of available channels in persistent memory 170 and through its list of subscribers 190. It then assembles a list of channels that are matched to their subscribing devices (such as devices 103-108). For every available channel, it will send the subscriber list to presence function 150. Presence function 150 then informs CSME 120 which of the receivers are active in the network. CSME 120 then removes from the list the subscribing devices that are not active in the network.

CSME 120 then sends the list of active subscriber devices to location function 140. Location function 140 then sends a message to CSME 120 that describes which cells are currently servicing the active subscriber devices. The list then has both a cell identifier and a unique channel identifier(s) for each active subscriber device. CSME then goes through the list and, for each channel, eliminates all but one subscriber in each cell. Thus, if devices 105 and 106 of cell 101b each subscribe only to the sports channel, CSME 120 will take either 105 or 106 off of the list that it is creating. The process of determining which devices to leave off of the list may be arbitrary or random or may follow a more reasoned algorithm. As will be explained below, those subscribers eliminated from the list will have a chance to receive the broadcast despite their elimination. The list then includes, at a maximum, only one subscriber device in each cell for each available content channel. The list is now channel-to-cell map 160. In this example, channel-to-cell map 160 is stored in Random Access Memory (RAM), rather than in persistent storage 170, so that it may be accessed and updated quickly by CSME 120.

Each subscriber in channel-to-cell map 160 is then designated as a target device by CSME 120. For example, if device 105 is not included in channel-to-cell map 160, device 106 will be the target receiver for the sports channel in cell 101b. CSME 120 then sends content for the various channels to router 110, which routes the content as messages to the target devices in cells 101a-101d. Content from the sports channel is sent to cell 101b as a message to device 106. it should be noted that routers are standard components of current cellular networks. Thus, an advantage of some embodiments of this invention is that the existing network infrastructure can be utilized from this point on.

It should be noted that if other sports channel subscribers are serviced by any of cells 101a, 101c, or 101d, those cells will also be sent sports channel content in the form of a message to a target subscriber present therein. Further, CMA 120 performs the same process for all available channels, so that, for example, each cell may have as many target receivers as there are channels.

Device 106 receives the content and sends an acknowledgement message to CSME 120 confirming receipt of the content. The acknowledgement message allows the wireless network to ensure delivery of the content to the cells and the devices therein. Device 106 then consumes the content. As explained below, other devices in the cell that subscribe to the channel also consume the content.

Because base station 102b radiates the message in cell 101b, device 105 also receives the content, even though the content was sent as a message to device 106. Device 105 "looks" for unique channel identifiers in each message sent in its cell. When messages contain unique identifiers for channels to which device 105 does not subscribe, device 105 merely disregards the message. When messages contain unique identifiers for channels to which device 105 subscribes, device 105 consumes the content. In this example, device 105 detects the unique identifier in the message that was sent to device 106 and presents the content to its user using its key. Active devices in cell 101b that are not subscribers to the sports channel receive the message, but disregard the message because they do not have the appropriate key. In this way, out of all active devices in cell 101b, only subscribers such as 105 and 106 allow a user to consume content from the sports channel. The same procedure will be applied to other available channels and other cells.

In each cell 101a-101d, CSME 120 broadcasts content from a variety of channels using one message per target device per channel. This ability saves resources of the wireless network. For instance, in a traditional wireless telephone network, identical content that is to be delivered to one thousand devices spread over ten cells requires one message per device (one thousand messages) to be sent. By contrast, system 200 allows the wireless network to service all one thousand devices with ten messages (one for each cell, assuming the content is associated with only one channel).

In an alternate embodiment, channel-to-cell map 160 may be pared down even further. In the last example, each target device is also a subscriber to the channel in question so that each cell may have as many target devices as there are available channels. In this alternative embodiment, there is a maximum of one target device per cell regardless of the number of channels broadcast to the cell. To accomplish this, CSME 120 eliminates from the map all subscribers but one for each cell, and designates the remaining device in each cell the target for all channels to be broadcast to that respective cell. For example, if cell 101b serves subscribers to a news channel and the sports channel, and if device 105 subscribes only to the news channel, and device 106 subscribes only to the sports channel, CSME 120 will match cell 101b to both the sports channel and the news channel. CSME 120 will then eliminate all devices in cell 101b from map 160, except for one. Say device 105 is left on map 160. CSME 120 designates device 105 the target device for cell 101b, and sends messages for the sports channel and the news channel to device 105. Device 105 sends acknowledgement messages to CSME 120 for the messages that it receives. Device 105 disregards the content from the sports channel and presents the content from the news channel to the user. Other subscribing devices in cell 101b consume the content as in the last example.

CSME 120 creates channel-to-cell map 160 periodically and at short intervals by running channel-to-cell map creation program 125 in the background. This functionality provides CSME 120 with access to fresh information about user locations and subscriptions. The wireless provider may then provide better customer service by keeping waiting times short when a subscriber powers up his or her device. Fresher information also allows CSME 120 to be more accurate in its routing instructions to router 110 because CSME 120 has access to routing information that is current within a short time interval.

Figure 3:
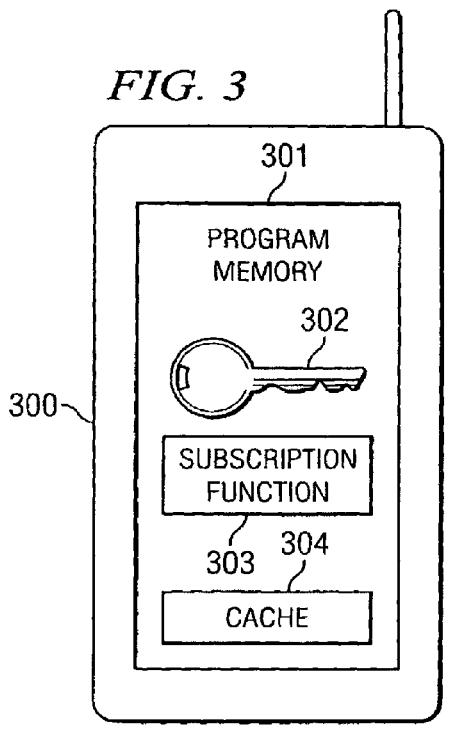
FIG. 3 is an illustration of an exemplary device for use with the system of FIG. 2.

FIG. 3 is an illustration of exemplary device 300 for use with system 200. Device 300 is a wireless cellular telephone for use with the wireless network of system 200. Device 300 includes program instructions and data 301. Program instructions and data 301 include the instructions that are executed by a processor (not shown) in device 300, which give device 300 its functionality. The programming instructions include, among other things, processor-executable code that controls the transmitting and receiving during a telephone call, the user display, and the like. The programming instructions may be located in on-chip memory, in off-chip memory, or in both. Program instructions and data 301 also includes data that may be read or written in memory. In one example, the memory that stores program instructions and data 301 includes flash memory, such that the program instructions are firmware.

Device 300 also includes subscription function 303, which is part of program instructions and data 301. Subscription function 303 contains the instructions and data that allow device 300 to provide a user with the ability to subscribe to one or more channels through device 300. In one example, subscription function 303 is a GUI that provides interactivity between the user and the CSME by retrieving a list of available subscription channels from the CSME and prompting the user for a selection among those channels. Subscription function 303 then sends that user selection to the CSME. The CSME then registers the requested subscription, acknowledges the selection request to the user, and sends key 302. In this example, subscription function 303 does not contain key 302; however, such an arrangement is possible in other embodiments. In another example, subscription function 303 is very minimal and merely keeps track of subscriptions and keys, with most of the registering functionality located in the wireless network. The invention is not limited by the particular subscription technique. Instead, many different subscription techniques are within the scope of the invention.

Device 300 also includes key 302. Key 302, in one example, is a set of instructions that, when executed, present channel content to the user. In another example, key 302 is a decryption key to decode channel content. In yet another example, key 302 is data that resides in memory and is accessed by program instructions to determine which channel content device 300 may present. Other embodiments are possible and are within the scope of the invention.

Another feature that is offered by Device 300 is caching of content. For example, when subscribed channel content is received by Device 300, device 300 can present the user with a choice—to view the content or to cache the content in cache 304 for later viewing. Such a feature allows a user some flexibility in viewing the content. In an alternate embodiment, cache 304 is located on equipment in the wireless network. By placing cache 304 on the wireless network, the cost and size of Device 300 can be kept lower than if it is located in device 300. In one example, cache 304 includes RAM that is selected for its cost, speed, size, and power requirements.

Figure 4:
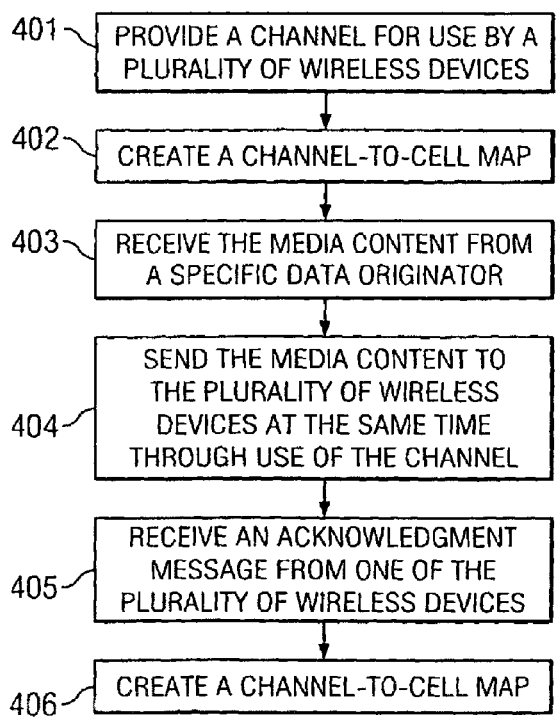
FIG. 4 is a flowchart illustrating an exemplary method that may be performed by a CSME, such as CSME 120 of FIGS. 1 and 2.

FIG. 4 is a flowchart illustrating exemplary method 400 that may be performed by a CSME, such as CSME 120 of FIGS. 1 and 2. In block 401, the CSME provides a channel for use by a plurality of wireless devices. A channel may be implemented using a unique channel identifier (e.g., any alphanumeric value) as a means to identify data destined for a specific channel. The step includes assigning the unique channel identifier to be used for transmissions of certain media content. For example, if a data originator registers a sports channel, in block 401, the CSME writes in its database in persistent storage that there is a sports channel with a specific unique identifier. From that point on, media content for the sports channel will be associated with the unique identifier. Further, the CSME provides subscribers to that channel with means to access the content. The means may include a key, as explained earlier. Therefore, by registering a channel, assigning a unique channel identifier to that channel, and providing subscribers with means to access the content, the CSME provides a means to connect the device with the channel.

In block 402, the CSME creates a channel-to-cell map. The CSME uses the channel-to-cell map to designate target devices in cells. As explained above, broadcasting channel content only as messages to the target devices is a way to save transmitting capacity. The creation of the channel-to-cell map is described with regard to FIG. 5. In block 403, the CSME receives the media content from a specific data originator. For example, the data originator that registered the sports channel pushes content to the CSME. The CSME associates the content with the appropriate channel identifier.

In block 404, the CSME sends the media content to the plurality of wireless devices at substantially the same time through use of the channel. Sending the media content at substantially the same time includes transmissions that are at or near the same time. For example, a single broadcast to a number of devices is sending content "at substantially the same time" to the devices. Similarly, sending the content at a number of different cellular base stations, each base station with a different delay is also sending content at "substantially the same time" to the devices. Embodiments of the invention include transmissions that include delays from electronic equipment, electromagnetic wave propagation, and the like. In this example, the step of sending the media content includes routing the media content associated with the channel identifier to a base station in a cell identified in the channel-to-cell map. The step also includes transmitting the media content to the plurality of wireless devices as a message to a single wireless device. In each cell, the media content is sent as a message to a target device, and all active subscribing devices in the cell receive and consume the uniquely identified content. Thus, in each cell, a channel's content can be sent to the subscribing devices in one message transmission. (It should be noted, though, that some content may be sent to the target subscriber in more than one message transmission because of its size or content.) Further, because method 400 is adaptable for use in current cellular networks, this step may also include radiating a signal from a base station according to a multiple access technique.

In block 405, the CSME receives an acknowledgement message from one of the plurality of wireless devices. Specifically, the target device in the cell sends the acknowledgement message to the CSME. Other subscribing devices that were not designated as target devices do not send an acknowledgment. In block 406, the CSME creates another channel-to-cell map. In this example, creation of channel-to-cell maps is periodic in order to provide the CSME with current information.

Figure 5:
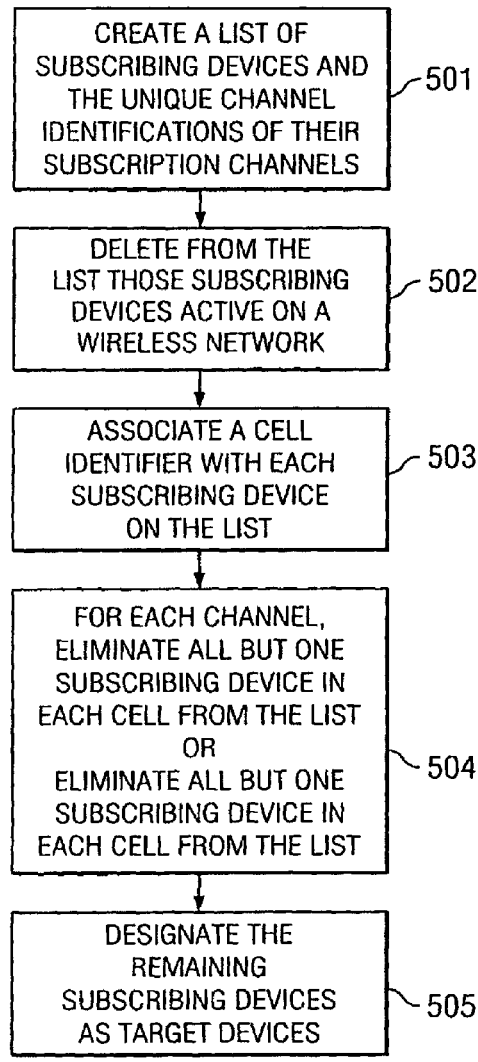
FIG. 5 is an illustration of an exemplary method that may be performed by the CSME to create a channel-to-cell map.

FIG. 5 is an illustration of exemplary method 500 that may be performed by the CSME to create a channel-to-cell map. In block 501, the CSME creates a list of channels, their unique channel identifications, and their subscribing devices. The CSME performs this operation by querying the database in persistent storage 170 (of FIG. 2) to gather all channels and match them to their subscriptions. The list may be quite large, and subsequent steps operate to reduce the entries in the list.

In block 502, the CSME deletes from the list those subscribing devices that are not active on the wireless network.

The CSME performs this operation by contacting a presence function, such as presence function 150 of FIG. 2. The presence function keeps track of which wireless devices are currently active in the network. Devices that are not known to be currently active in the network are eliminated from the list.

In block 503, the CSME associates a cell identifier with each subscribing device on the list. The CSME performs this operation by contacting a location function, such as location function 140 of FIG. 2. The location function keeps track of the cells that service the active wireless devices in the network. The CSME uses the location information to match a cell identifier with each subscriber in the list. The list then includes all active subscribers in the network matched to their current cell locations.

In block 504, for each channel, the CSME eliminates all but one subscribing device in each cell from the list. The list then includes a maximum of one subscriber per cell per channel. These subscribing devices are designated as target devices for their particular cells and channels in block 505. When the CSME sends channel content, it will send a number of messages equal to or less than the number of cells multiplied by the number of channels. The number of messages will be lower if one or more cells do not service an active subscriber of one or more channels. Of course, if a cell services no active subscribers, no subscription content will be sent to that cell.

Also in block 504, an alternative embodiment seeks to cut the number of messages sent by the CSME even further by designating a maximum of one target device per channel. In this embodiment, the CSME eliminates all but one subscribing device in each cell from the list. It then designates those devices as target devices for those respective cells in block 505. Thus, if one cell has active subscribers for three different channels, the channel-to-cell map will designate one subscriber in that cell as the target device for all three channels. When the messages are sent, the target device will send acknowledgement messages back, but will not consume unsubscribed content. In this embodiment, it is not a requirement that a target device subscribe to all of the represented channels. Rather, a single subscriber acts as the sole target device for its cell whether it subscribes to one channel or ten.

As a further feature, various wireless networks provide roaming capabilities, such that a network user in another network's area may still receive content from his or her home network. It is possible to adapt presence function 150 and location function 140 (both of FIG. 2) to allow for roaming, thereby providing subscription content to users in other network provider areas. Presence function 150 and location function 140 operate, in part, by accessing a Home Location Register (HLR) and Visitor Location Register (VLR), as is known in the art (it should be noted that these functions may have different names in different network systems). A possible feature of a roaming embodiment is that channel identifiers are standard from network to network. Such a feature allows each network to provide subscription content to its roaming devices as it would for its home devices, rather than as additional individual messages to the roaming devices.

While the examples above describe one or more specific embodiments, other alternative embodiments are possible and are within the scope of the invention. In one alternative embodiment, base stations scramble channel content, and the keys provided to subscriber devices operate to descramble (or "decode") the content. Thus, scrambling codes are assigned by channel, rather than, for example, by subscriber, as in a CDMA scenario. In effect, channels are identified by their scrambling codes, and the process used to consume content at the handset includes decoding. Although such an embodiment uses coding and decoding to create channels, it is compatible with current CDMA networks, such as, by operating in the network to substitute channel codes for device codes when channel content is sent out.

While the particular embodiments described in FIGS. 1-5 present specific functions and arrangements, it should be noted that those embodiments are examples. Various additional alternative embodiments are possible. For instance, creating a channel-to-cell map, as in blocks 402 and 406 of FIG. 4, may be performed more than twice, or may even be performed out of order in method 400. Further, CSME 120 (of FIG. 2) may be a collection of programs run on more than one computer, rather than as a single program run on one computer.

Moreover, when implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for distributing media content in a point-to-point network, the method comprising:
providing a channel for sending certain media content to a plurality of cellular devices;
associating the certain media content with a unique channel identifier for the channel;
sending the unique channel identifier to ones of the plurality of cellular devices that are authorized to access the certain media;
broadcasting the media content associated with the unique channel identifier to the plurality of cellular devices at substantially the same time;
providing a plurality of channels for sending different media content to the plurality of cellular devices;
associating the different media content with a respective unique channel identifier for each of the channels; and
sending the respective unique channel identifiers to ones of the plurality of cellular devices that are authorized to access the different media content.

2. The method of claim 1, wherein broadcasting the media content associated with the unique channel identifier includes transmitting the media content associated with the unique channel identifier to the plurality of cellular devices as a message addressed to a single target cellular device.

3. The method of claim 1, further comprising:
creating a channel-to-cell map; and
routing the media content associated with the unique channel identifier to a base station in a cell identified in the channel-to-cell map.

4. The method of claim 3, wherein creating the channel-to-cell map includes
creating a list of subscribing cellular devices and unique channel identifications for each of the channels that the subscribing cellular devices subscribe to,
deleting from the list ones of the subscribing cellular devices that are not active on one of a plurality of cells of a cellular network,
associating a cell identifier for each of the plurality of cells with each remaining subscribing cellular device on the list,
for each channel, eliminating all but one subscribing cellular device in each cell from the list, and
designating the remaining subscribing cellular devices as target devices.

5. The method of claim 1, broadcasting media content associated with the unique channel identifier to the plurality of cellular devices includes radiating a signal from a base station according to a multiple access technique.

6. The method of claim 1, further comprising receiving the certain media content from a specific data originator, the certain media content including one or more of news, sports and special interest information.

7. The method of claim 1, further comprising creating a channel-to-cell map, wherein creating the channel-to-cell map includes
creating a list of each one of the plurality of cellular devices that subscribe to the channel,
deleting from the list those subscribing cellular devices that are not active on one of a plurality of cells of a cellular network,
associating a cell identifier for each of the plurality of cells with each remaining subscribing cellular device on the list,
eliminating all but one subscribing cellular device in each cell from the list, and
designating the remaining subscribing cellular devices as target devices.

8. The method of claim 1, further comprising receiving an acknowledgement message from one of the plurality of cellular devices responsive to broadcasting the media content associated with the unique channel identifier.

9. A system for distributing media content in a point-to-point network, the system comprising:
a Channel-to-Subscriber Management Entity configured to
register a channel for sending certain media content to a plurality of cellular devices,
register ones of the plurality of cellular devices authorized to access the certain media content,
associate the certain media content with a unique channel identifier for the channel, and
send the unique channel identifier to the registered ones of the plurality of cellular devices;
a base station associated with a cell, the base station configured to broadcast the media content associated with the unique channel identifier to ones of the plurality of cellular devices in the cell at the same time;
persistent storage that contains a database of information related to the registered channel and the registered ones of the plurality of cellular devices, the information including the cell that each of the registered cellular devices is currently located in; and
a router configured to send the media content associated with the unique channel identifier to each of the base stations that has a registered cellular device currently located in its cell.

10. The system of claim 9, wherein the Channel-to-Subscriber Management Entity is a server application running on a multiprocessor computer.

11. The system of claim 9, wherein the Channel-to-Subscriber Management Entity is further configured to receive the certain media content from a data originator.

12. The system of claim 9, further comprising a plurality of base stations each associated with a cell, each base station configured to broadcast the media content associated with the unique channel identifier to ones of the plurality of cellular devices in its cell at the same time.

13. The system of claim 9, wherein the base station is configured to broadcast the media content associated with the unique channel identifier as a message addressed to a single target one of the registered cellular devices.

14. A method for distributing media content in a point-to-point network, the method comprising:
providing a channel for sending certain media content to a plurality of cellular devices;
associating the certain media content with a unique channel identifier for the channel;
sending the unique channel identifier to ones of the plurality of cellular devices that are authorized to access the certain media;
broadcasting the media content associated with the unique channel identifier to the plurality of cellular devices at substantially the same time; and
creating a channel-to-cell map, wherein creating the channel-to-cell map includes
creating a list of each one of the plurality of cellular devices that subscribe to the channel,
deleting from the list those subscribing cellular devices that are not active on one of a plurality of cells of a cellular network,
associating a cell identifier for each of the plurality of cells with each remaining subscribing cellular device on the list,
eliminating all but one subscribing cellular device in each cell from the list, and
designating the remaining subscribing cellular devices as target devices.

15. The method of claim 14, wherein broadcasting the media content associated with the unique channel identifier includes transmitting the media content associated with the unique channel identifier to the plurality of cellular devices as a message addressed to a single target cellular device.

16. The method of claim 14, further comprising:
providing a plurality of channels for sending different media content to the plurality of cellular devices;
associating the different media content with a respective unique channel identifier for each of the channels; and
sending the respective unique channel identifiers to ones of the plurality of cellular devices that are authorized to access the different media content.

17. The method of claim 16, further comprising routing the media content associated with the unique channel identifier to a base station in a cell identified in the channel-to-cell map.

18. The method of claim 14, broadcasting media content associated with the unique channel identifier to the plurality of cellular devices includes radiating a signal from a base station according to a multiple access technique.

19. The method of claim 14, further comprising receiving the certain media content from a specific data originator, the certain media content including one or more of news, sports and special interest information.

20. The method of claim 14, further comprising receiving an acknowledgement message from one of the plurality of cellular devices responsive to broadcasting the media content associated with the unique channel identifier.

\* \* \* \* \*